United States Patent
Abramson et al.

(10) Patent No.: US 7,228,366 B2
(45) Date of Patent: Jun. 5, 2007

(54) METHOD AND APPARATUS FOR DETERMINISTIC REMOVAL AND RECLAMATION OF WORK ITEMS FROM AN EXPANSION BUS SCHEDULE

(75) Inventors: Darren L. Abramson, Folsom, CA (US); John S. Howard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 09/896,769

(22) Filed: Jun. 29, 2001

(65) Prior Publication Data

US 2003/0005197 A1    Jan. 2, 2003

(51) Int. Cl.
*G06F 3/00* (2006.01)

(52) U.S. Cl. .................. 710/19; 710/100; 710/300; 707/100; 707/206

(58) Field of Classification Search .......... 710/100, 710/300, 19; 707/100, 206; 711/141, 144
See application file for complete search history.

(56) References Cited

U.S. PATENT DOCUMENTS

| | | | | |
|---|---|---|---|---|
| 4,135,240 A | * | 1/1979 | Ritchie | 711/164 |
| 4,755,939 A | * | 7/1988 | Watson | 707/206 |
| 5,404,494 A | * | 4/1995 | Garney | 710/10 |
| 5,687,368 A | * | 11/1997 | Nilsen | 707/103 R |
| 5,740,387 A | * | 4/1998 | Lambrecht et al. | 710/300 |
| 5,778,432 A | | 7/1998 | Rubin et al. | |
| 5,878,221 A | * | 3/1999 | Szkopek et al. | 709/218 |
| 5,890,015 A | | 3/1999 | Garney et al. | |
| 5,924,098 A | | 7/1999 | Kluge | |
| 5,935,228 A | * | 8/1999 | Shinomura | 710/302 |
| 5,974,486 A | | 10/1999 | Siddappa | |
| 6,038,621 A | * | 3/2000 | Gale et al. | 710/56 |
| 6,065,020 A | * | 5/2000 | Dussud | 707/206 |
| 6,067,591 A | * | 5/2000 | Howard et al. | 710/100 |
| 6,073,205 A | | 6/2000 | Thomson | |
| 6,119,190 A | | 9/2000 | Garney | |
| 6,128,654 A | * | 10/2000 | Runaldue et al. | 709/219 |

(Continued)

FOREIGN PATENT DOCUMENTS

EP    668555 A2  *  8/1995

OTHER PUBLICATIONS

Brockman, Jay B., et al., "Microservers: A New Memory Semantics for Massively Parallel Computing," May 1999, ACM Proceedings of the 13th International Conference on Supercomputing, p. 454-463.*

(Continued)

*Primary Examiner*—Gopal C. Ray
*Assistant Examiner*—Matthew Spittle
(74) *Attorney, Agent, or Firm*—Blakely, Sokoloff, Taylor & Zafman LLP

(57) ABSTRACT

A method and apparatus for deterministic removal and reclamation of work items from an expansion bus schedule are disclosed herein. A work item is removed from an enabled expansion bus schedule data structure and a coherency signal is then generated utilizing an expansion bus host controller. The work item is then reclaimed in response to the generation of the coherency signal. In one embodiment, the enabled expansion bus schedule data structure is a Universal Serial Bus (USB) asynchronous schedule including a plurality of queue heads.

30 Claims, 8 Drawing Sheets

U.S. PATENT DOCUMENTS

| | | | |
|---|---|---|---|
| 6,131,135 A | 10/2000 | Abramson et al. | |
| 6,134,634 A * | 10/2000 | Marshall et al. | 711/143 |
| 6,145,045 A | 11/2000 | Falik et al. | |
| 6,173,355 B1 | 1/2001 | Falik et al. | |
| 6,191,713 B1 | 2/2001 | Ellis et al. | |
| 6,205,501 B1 | 3/2001 | Brief et al. | |
| 6,349,354 B1 * | 2/2002 | Garney | 710/313 |
| 6,389,433 B1 * | 5/2002 | Bolosky et al. | 707/205 |
| 6,453,403 B1 * | 9/2002 | Czajkowski | 711/170 |
| 6,484,218 B1 * | 11/2002 | Pipho | 710/32 |
| 6,496,904 B1 * | 12/2002 | Noonan | 711/141 |
| 6,502,111 B1 * | 12/2002 | Dussud | 707/206 |
| 6,502,158 B1 * | 12/2002 | James et al. | 710/311 |
| 6,510,498 B1 * | 1/2003 | Holzle et al. | 711/153 |
| 6,513,100 B1 * | 1/2003 | Clift | 711/154 |
| 6,606,674 B1 * | 8/2003 | Howard | 710/100 |
| 6,760,788 B2 * | 7/2004 | Knight | 710/19 |
| 6,763,391 B1 * | 7/2004 | Ludtke | 709/231 |
| 6,804,762 B1 * | 10/2004 | Dussud et al. | 711/170 |
| 6,813,730 B2 * | 11/2004 | Alexander et al. | 714/43 |
| 2001/0044861 A1 * | 11/2001 | Niwa et al. | 710/22 |
| 2002/0133533 A1 * | 9/2002 | Czajkowski et al. | 709/107 |
| 2002/0144042 A1 * | 10/2002 | Garney | 710/300 |
| 2002/0184446 A1 * | 12/2002 | Kagan et al. | 711/130 |
| 2003/0069905 A1 * | 4/2003 | Dussud | 707/206 |
| 2003/0140085 A1 * | 7/2003 | Moir et al. | 709/107 |
| 2003/0196010 A1 * | 10/2003 | Forin et al. | 710/52 |
| 2004/0162950 A1 * | 8/2004 | Coulson | 711/141 |

OTHER PUBLICATIONS

Katzberg, Jack D., "An Approach to Benchmarking Storage Reclamation Strategies," May 29, 1991-May 30, 1991, IEEE Western Canada Conference on Computer, Power and Communications Systems in a Rural Environment, p. 230-238.*

Lipari, Giuseppe, et al., "Greedy Reclamation of Unused Bandwidth in Constant-Bandwidth Servers," Jun. 19, 2000-Jun. 21, 2000, IEEE Euromicro Conference on Real-Time Systems.*

Kordale, R., et al., "Distributed/Concurrent Garbage Collection in Distributed Shared Memory Systems," Dec. 9, 1993-Dec. 10, 1993, IEEE Proceedings of the Third International Workshop on Object Orientation in Operating Systems, p. 51-60.*

Boehm, Hans-Juergen, "Hardware and Operating System Support for Conservative Garbage Collection," Oct. 17, 1991-Oct. 18, 1991, IEEE Proceedings, International Workshop on Object Orientation in Operating Systems, p. 61-67.* http://www.usb.org/developers/docs.html; Universal Host Controller (UHCI) Design Guide, Revision 1.1; 47 pages; Mar. 1996.

http://www.usb.org/developers/docs.html; OpenHCI: Open Host Controller Interface Specification for USB; Sep. 14, 1999 2:33 PM, 160 pages, Release 1.0a.

http://www.usb.org/developers/docs.html; Universal Serial Bus Specification Revision 2.0; 650 pages; Apr. 27, 2000.

http://www.netchip.com/pdf_files/Net2290-4page8×11.pdf; NET2290 32-Bit USB 2.0 Programmable Peripheral Controller; 4 pages; Oct. 2000.

http://developer.intel.com/technology/usb/download/ehci-r095.pdf;Enhanced Host Controller Interface Specification For Universal Serial Bus; Revision 0.95; pp. 138 pages; Nov. 10, 2000.

http://www.cypress.com/pub/datasheets/7c68013.pdf; CY7C68013 EZ-USB FX2 USB Microcontroller High-Speed USB Peripheral Controller; 45 pages; Nov. 20, 2000.

http://www.netchip.com/pdf_files/Net2270DataLtr.pdf; NET2270 16-Bit USB High-Speed Programmable Peripheral Controller; 4 pages; Revision Feb. 2001.

http://www.lucent.com/micro/usb/usbdocs.html; USS-2000 Four-Port USB 2.0 PCI-to-USB Host Controller; Data Sheet, Rev. 1; 58 pages; Mar. 2001.

http://www.netchip.com/library/spec/NET2270%20Spec3.0.pdf; NET2270 USB 2.0 Interface Controller For Revision 1 IC; Doc. # 605-0139-0101; Revision 1.1; 86 pages; Mar. 21, 2001.

* cited by examiner

METHOD AND APPARATUS FOR DETERMINISTIC REMOVAL AND RECLAMATION OF WORK ITEMS FROM AN EXPANSION BUS SCHEDULE

FIELD OF THE INVENTION

The invention relates generally to the field of computer systems. More particularly, the invention relates to the deterministic removal and reclamation of work items from an expansion bus schedule.

BACKGROUND

Peripheral devices may utilize an expansion bus to couple to and communicate with a computer system. Examples of expansion busses include the Industry Standard Architecture (ISA), Enhanced ISA (EISA), Micro Channel Architecture (MCA), Video Electronics Standards Association Local Bus (VESA or VL), Personal Computer Memory Card Industry Association (PCMCIA), Small Computer System Interface (SCSI), Peripheral Component Interconnect (PCI), IEEE 1394 (Firewire), and the Universal Serial Bus (USB). In a USB system, one or more USB peripheral devices are coupled via a shared USB interconnect to a single host computer system including client and USB system software as well as a USB host controller hardware interface. The USB supports functional data and control exchange between the USB host and a USB device as a set of one or more logical channels or "pipes" between client software and a particular endpoint on a USB device. Each pipe is associated with one of four USB-defined transfer types which are optimized for different client and device service requirements.

Because the USB provides a shared physical transfer medium, bandwidth must be allocated among client software transfer requests. When a transfer request for a particular pipe is received from a client application, USB system software puts the request into the appropriate format and adds it to a schedule data structure or "transaction list" depending on the pipe's associated transfer type. An asynchronous schedule data structure is utilized for control and bulk transfer types while isochronous and interrupt transfers are placed into a periodic schedule data structure to ensure proper transmission latency. Once enabled, the schedules are executed by the host controller of the USB hardware interface to generate transactions on the USB. As the schedules are traversed, the host controller may cache the context or "state" of the schedule including schedule data structure elements or "work items".

The removal and reclamation of work items from the periodic and asynchronous schedules is similarly handled by USB system software. When a work item is removed from a schedule data structure however, it is unknown whether the host controller has a copy of the removed work item or a reference to it stored in cache. The removed work item cannot be reclaimed (i.e. its associated memory cannot be freed or reused) until it is determined that all cached state or data structures relating to the removed work item have been evicted or "released" by the host controller. Since the periodic schedule must regularly advance to ensure transmission latency for isochronous transfers, cache flushes occur on a periodic (frame or micro-frame) basis after which a removed periodic schedule work item may be reclaimed. Accordingly, in USB systems including a single schedule data structure, the coherency of the schedule may be ensured by waiting a predetermined amount of time after a work item is removed to reclaim it. In some USB systems however, separate periodic and asynchronous schedule data structures are defined. Consequently, methods for reclaiming asynchronous schedule work items in such systems based on the passage of time have proven inadequate to accurately determine when a removed asynchronous schedule data structure work item may be reclaimed to ensure asynchronous schedule coherency.

BRIEF DESCRIPTION OF THE DRAWINGS

The present invention is illustrated by way of example and not limitation in the figures of the accompanying drawings, in which.

DETAILED DESCRIPTION

A method and apparatus for the deterministic removal and reclamation of work items from an expansion bus schedule are described herein. In the following detailed description, numerous specific details such as specific computer system or host controller architectures are set forth in order to provide a more thorough understanding of the present invention. It should be evident however, that these specific details need not be used to practice the present invention. In other circumstances, well-known data structures, system elements, or connections have been omitted or have not been described in particular detail in order to avoid unnecessarily obscuring the present invention.

Figure 1:
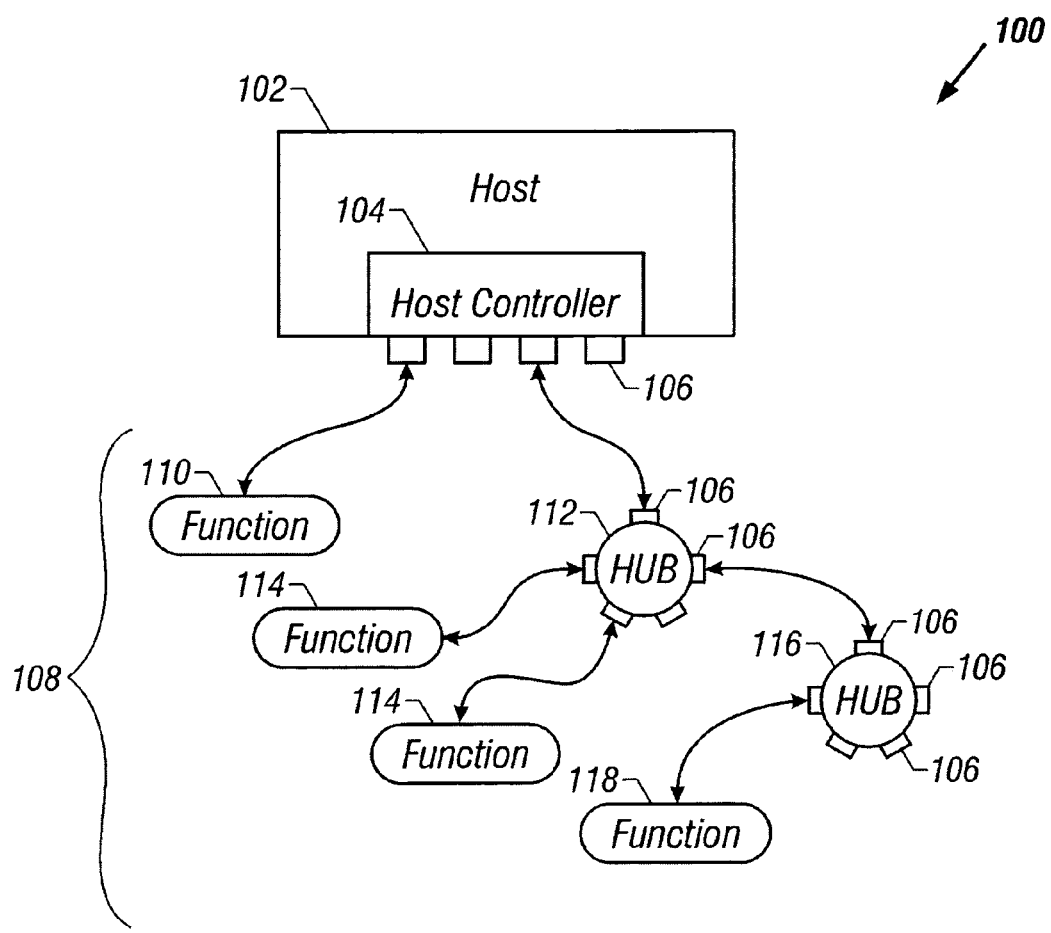
FIG. 1 illustrates a USB physical bus topology according to an embodiment of the present invention.

FIG. 1 illustrates a USB physical bus topology according to an embodiment of the present invention. It will be appreciated that both the number and arrangement of the USB devices illustrated are arbitrary and meant to be illustrative of, rather than limiting to, the present invention.

The depicted USB system 100 includes USB devices 108 coupled to a host computer system 102 via a Universal Serial Bus. Each USB device 108 in the illustrated USB system 100 provides either a peripheral capability to the host or an attachment point, called a port 106, on the USB. Such USB devices 108 are called functions and hubs, respectively. Although not shown in the illustrated embodiment, USB also provides support for "compound devices" which implement multiple functions in a single physical device. Similarly, USB provides support for "composite devices" which implement multiple interfaces controlled independently of one another. Both compound and composite devices are included in alternative embodiments of the present invention. The host computer system 102 occupies a unique position as the coordinating entity for the USB system 100. In addition to its special physical position, host computer system 102 has specific responsibilities with regard to the USB system 100 and its attached USB devices 108. For example, host computer system 102 provides Plug-and-Play (PnP) device support and also allows USB devices 108 to be "hot-swapped" without requiring the host computer system 102 to be powered down or restarted. To facilitate this, host computer system 102 monitors the topology of the USB system 100 to detect and account for the addition or removal of USB devices 108 in a process called bus enumeration. Host computer system 102 furthermore controls or "mediates" access to the USB physical bus medium using various schedule data structures.

Host computer system 102 includes a USB host controller 104 according to an embodiment of the present invention which acts as a root hub for the USB system 100 and facilitates communication between the host computer system 102 and USB devices 108 on the bus. USB host controller 104 provides one or more ports 106 called root ports to which other USB devices 108 in USB system 100 may be coupled. Although a physical USB host controller device 104 has been shown, it will be appreciated that a USB host controller may be implemented using hardware, firmware, software, or any combination thereof. Similarly, although only a single host controller 104 has been illustrated, in alternative embodiments host controller 104 is coupled with a companion or legacy host controller to support communication according to one or more additional bus standards.

A USB device 108 may be coupled directly to the host computer system 102 via a root port 106 on the USB host controller 104 such as function 110 and hub 112 of the illustrated embodiment. Alternatively, a USB device 108 may be coupled to the host computer system 102 via a port 106 on another hub 112, 116 in the USB system 100 resulting in a tiered-star topology with a hub at the center of each star. For example, hub 116, functions 114, and function 118 are each coupled to the host computer system 102 in this manner. By coupling hubs together in this way, up to 127 USB devices 108 may be coupled to a host computer system 102.

Figure 2:
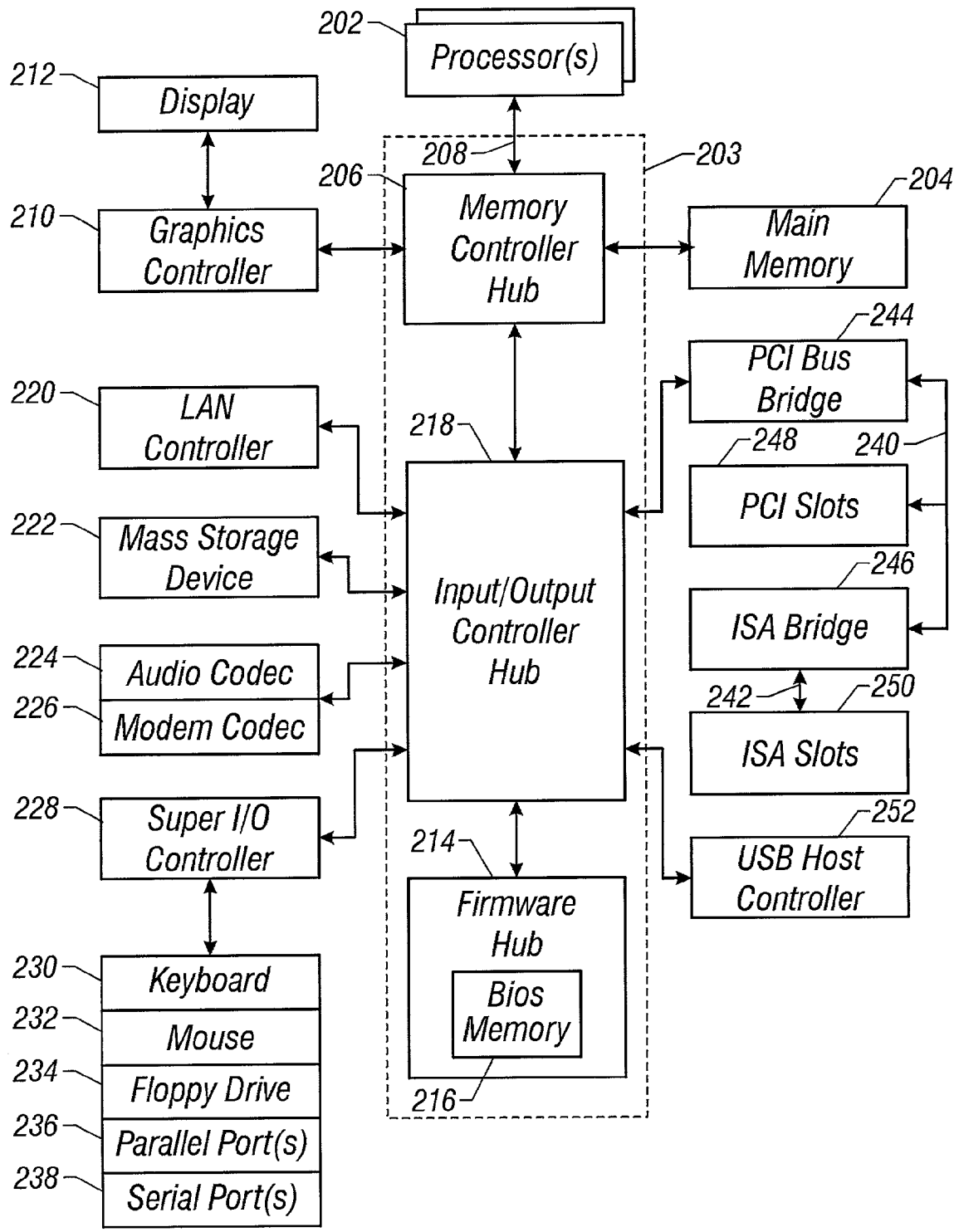
FIG. 2 illustrates an exemplary computer system block diagram according to an embodiment of the present invention.

FIG. 2 illustrates an exemplary computer system block diagram according to an embodiment of the present invention. Although described in the context of computer system 200, the present invention may be implemented in any suitable data processing system such as a network computer or other "thin client", a palmtop computing device, robust cellular or Personal Communications Services (PCS) telephone, etc. having a greater or lesser number of system components.

As illustrated in FIG. 2, computer system 100 comprises one or more processors 202 and a chipset 203 coupled to a processor system bus 208. Processor(s) 202 may each comprise any suitable processor architecture and for one embodiment comprise an Intel™ Architecture, used for example, in the Pentium™ family of processors available from Intel™ Corporation of Santa Clara, Calif. Chipset 203 for one embodiment of the present invention comprises a "north bridge" or memory controller hub (MCH) 206, a "south bridge" or input/output (I/O) controller hub (ICH) 218, and firmware hub (FWH) 214 coupled together as shown. MCH 206, ICH 218, and FWH 214 may each comprise any suitable circuitry and for one embodiment, are each formed as a separate integrated circuit chip. Chipset 203 for other embodiments may comprise any suitable one or more integrated circuit or discrete devices.

FWH 214 may comprise any suitable interface controller to provide a suitable communication link to ICH 218. FWH 214 comprises a basic I/O system (BIOS) memory 216 to store suitable system BIOS software or firmware. BIOS memory 216 may comprise any suitable non-volatile memory such as a flash memory for example.

MCH 206 may comprise a suitable interface controller to provide for any suitable communication link to processor system bus 208 and/or to any suitable device or component in communication with MCH 206. MCH 206 for one embodiment provides suitable arbitration, buffering, and coherency management for each interface.

MCH 206 is coupled to processor system bus 208 and provides an interface to processor(s) 202 over the processor system bus 208. Processor(s) 202 may, in alternative embodiments of the present invention, be combined with MCH 206 to form a single chip. MCH 206 for one embodiment also provides an interface to a main memory 204 and a graphics controller 210 each coupled to MCH 206. Main memory 204 is capable of storing data and/or instructions executable on a processor such as processor 202 of computer system 200 and may comprise any suitable memory such as dynamic random access memory (DRAM) for example. Graphics controller 210 controls the display of information on a suitable display 212, such as a cathode ray tube (CRT) or liquid crystal display (LCD) for example, coupled to graphics controller 210. In the illustrated embodiment, MCH 206 interfaces with graphics controller 210 through an accelerated graphics port. However, it will be appreciated that the present invention may be practiced using any suitable graphics bus or port standard. Graphics controller 210 for one embodiment may alternatively be combined with MCH 206 to form a single chip.

MCH 206 is also coupled to ICH 218 to provide access to ICH 218 through a hub interface. ICH 218 provides an interface to I/O devices or peripheral components for computer system 200. ICH 218 may comprise any suitable interface controller to provide for any suitable communication link to MCH 206 and/or to any suitable device or component in communication with ICH 218. ICH 218 for one embodiment provides suitable buffering and arbitration for each interface.

In the illustrated embodiment, computer system 200 includes a USB host controller 252 according to the present invention for coupling one or more suitable USB devices to computer system 200 via ICH 218. ICH 218 further provides an interface to a local area network (LAN) controller 220, a mass store device 222, an audio coder/decoder (codec) 224 and a modem codec 226. An interface is also provided, through a super I/O controller 228 to a keyboard 230, a mouse 232, a floppy disk drive 234, as well as additional devices via one or more standard serial 238 or parallel 236 ports. LAN controller 220 or alternatively modem codec 226 may be utilized to couple computer system 200 to a suitable communications network via various well-known methods. Audio devices such as speakers, microphones, etc. may be coupled to computer system 200 via audio codec 224. Mass store device 222 may comprise any suitable device or component to store data and/or instructions such as a tape or fixed disk magnetic storage device, or an optical storage device such as a compact disk (CD) or digital versatile disk (DVD) read only memory (ROM) device. In one embodiment of the present invention, mass store device 222 comprises an integrated drive electronics (IDE) hard disk drive (HDD).

Interfaces are further provided in the illustrated embodiment to couple one or more suitable peripheral component interconnect (PCI) and industry standard architecture (ISA) devices to computer system 200. A PCI bus 240 is provided using a PCI bus bridge 244 coupled to ICH 218 via a hub/bridge interface. One or more suitable PCI devices may then be coupled to computer system 200 via PCI slots 248 on the provided PCI bus 240. Similarly, an ISA bus 242 is provided via an ISA bridge 246 coupled to PCI bus 240 enabling one or more suitable ISA devices to be coupled to the computer system 200 via one or more ISA slots 250.

The system of the present invention includes software, information processing hardware, and various processing operations further described herein. The features and process operations of the present invention may be embodied in executable instructions embodied within a machine-readable medium such as main memory 204, mass store device 222, removable disk media coupled with floppy disk drive 234, a communications network available via LAN controller 220 or modem codec 226, or the like. A machine-readable medium may include any mechanism that provides (i.e., stores and/or transmits) information in a form readable by a machine (e.g., computer system 200). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc. The instructions can be used to cause a general purpose or special purpose processor such as processor 202, programmed with the instructions, to perform methods or processes of the present invention. Alternatively, the features or operations of the present invention may be performed by specific hardware components that contain hard-wired logic for performing the operations, or by any combination of programmed computer components and custom hardware components.

Figure 3:
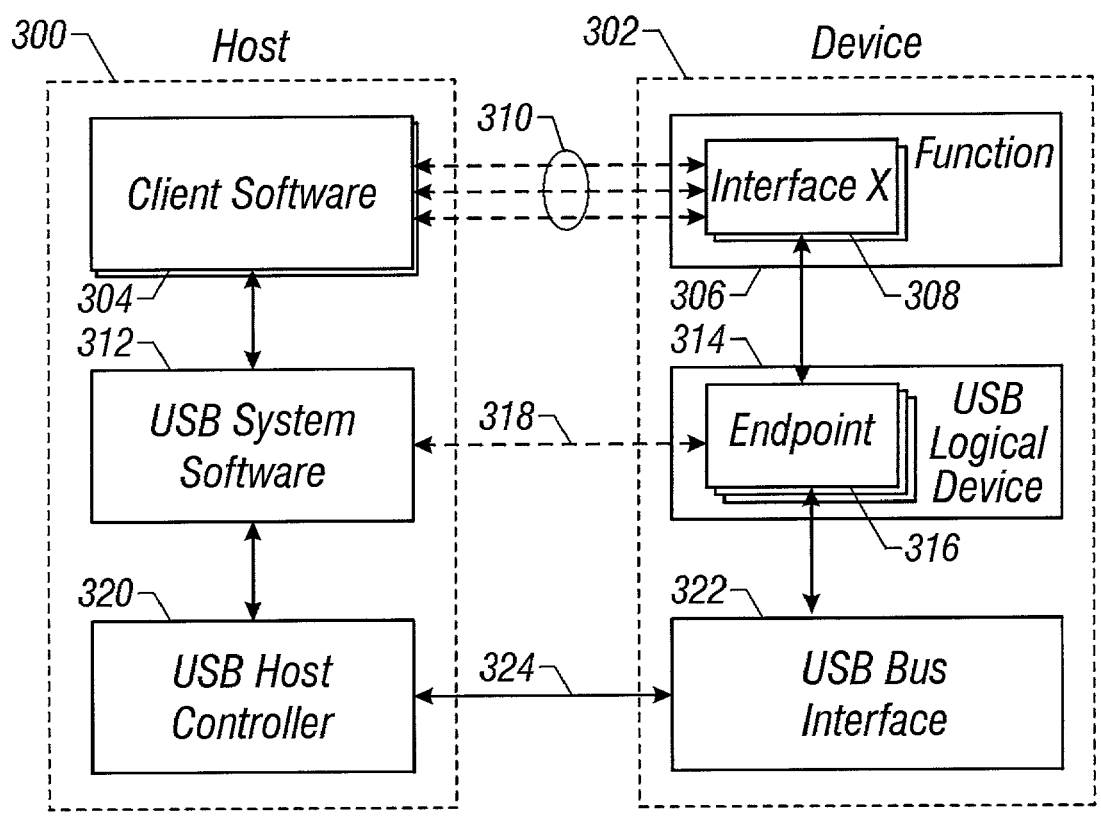
FIG. 3 illustrates an interlayer communications model block diagram according to an embodiment of the present invention.

FIG. 3 illustrates an interlayer communications model block diagram according to an embodiment of the present invention. In the illustrated diagram, a USB host 300 and a USB device 302 communicate using a number of interacting communication layers. At a function layer, a client software application 304 within USB host 300 communicates with a USB function 306 within a USB device 302 using a set of one or more USB pipes known as a pipe bundle 310. Each pipe of pipe bundle 310 is associated with a uniquely addressable portion of a USB device 302 that is a source or sink of data in communication flow between a USB host 300 and the USB device 302 known as an endpoint 316. Each pipe is also associated with a USB transfer type such as isochronous, interrupt, control, or bulk. Together, the set of endpoints associated with pipe bundle 310 make up an interface 308 for communication between a client software application 304 and a particular function 306 of USB device 302.

Isochronous transfers are transfers of isochronous data which occupy a pre-negotiated amount of USB bandwidth with a pre-negotiated delivery latency and are sometimes also called streaming real time transfers. Isochronous data is continuous and real-time in creation, delivery, and consumption. Isochronous data must be delivered at the rate received to maintain its timing. In addition to delivery rate, isochronous data may also be sensitive to delivery delays. A typical example of isochronous data is voice. The timely delivery of isochronous data is ensured at the expense of potential transient losses in the data stream. In other words, any error in transmission is not corrected by hardware mechanisms such as retries. All non-isochronous transfer types involve data which may be queued and retried upon delivery failure or delay.

Interrupt transfers involve limited-latency data transfer to or from a device. Such data may be presented for transfer by a device at any time and is delivered by the USB at a rate no slower than is specified by the device. Interrupt data typically consists of event notification, characters, or coordinates that are organized as one or more bytes. An example of interrupt data is the coordinates from a pointing or cursor control device. Although an explicit timing rate is not required, interactive data may have response time bounds that the USB must support. Control transfers are used to transfer data used by the USB System Software to configure devices when they are first attached. Lastly, bulk data transfers typically involve large amounts of sequential data, such as that used for printers or scanners where the reliability and accuracy of data transmission is relevant. Reliable exchange of data is ensured using error detection and by invoking a limited number of retries.

At a USB logical device layer, USB host 300 includes USB system software 312 according to the present invention and USB device 302 includes a USB logical device representation 314. USB system software 312 acts as an interface between a client software application and a particular USB host controller hardware implementation to facilitate transfers on the USB and is also responsible for the configuration and control of USB devices. At this layer, USB logical device 314 appears to the USB system as a collection of endpoints 316 making up the interfaces 308 to the various functions 306 of the device. In one embodiment, a USB driver (USBD) component of USB system software provides this abstraction to facilitate USB data transfer and utilizes a default control pipe 318 to initialize and generically manipulate the USB logical device 314 (e.g., to configure the logical device). Each USB device provides input and output endpoints having endpoint number zero to which the default control pipe 318 communication channel to USBD is attached.

When a device is attached and configured, the USBD is involved to ensure that the requested device configuration can be accommodated on the bus. The USBD receives configuration requests from configuring USB software client applications 304 that describe the requested device configuration: endpoint(s), transfer type(s), transfer period(s), data size(s), etc. The USBD either accepts or rejects a configuration request based on bandwidth availability and the ability to accommodate that request type on the bus. If it accepts the request, the USBD creates a pipe for the requester of the requested type and with appropriate constraints as defined for the transfer type. Once a device is configured, a software client application 304 can make a request, called an I/O request packet (IRP), to move data between itself and an endpoint 316 of a USB function on the configured device.

In one embodiment, USB system software further includes a host controller driver (HCD) component which provides an abstraction of host controller hardware and of the host controller's view of data transmission over the USB. An HCD serves as an interface between a USB host controller and the USBD software. This interface allows a range of host controller implementations without requiring all client software applications 304 to be dependent on any particular implementation. A single USB driver can therefore support different host controllers without requiring specific knowledge of a host controller implementation. The HCD is responsible for tracking client software application-requested IRPs in progress and ensuring that USB bandwidth and (micro)frame time maximums are not exceeded.

To facilitate this, an HCD administers one or more schedule data structures or "transaction lists" within the USB system, adding an appropriate work item when a transfer request (IRP) is made by a client software application 304 and removing work items where appropriate. When an IRP is complete, the HCD notifies the requesting software client 304 of the completion status for the IRP. A schedule data structure is a host controller implementation-dependent description of the current outstanding set of bus transactions that need to be run on the USB. Typically, only the HCD and its host controller have access to the specific schedule representation. Each description contains transaction descriptions in which parameters, such as data size in bytes, the device address and endpoint number, and the memory area to which data is to be sent or received, are identified.

At a USB bus interface layer, a USB host controller 320 according to the present invention within USB host 300 is coupled to a USB bus interface 322 in USB device 302 via a physical USB interconnect 324 such as a USB cable, fiber, wireless infrared or radio frequency connection, or the like. All logical communication occurring at the function or logical device layers is provided to the bus interface layer and accomplished using the physical USB interconnect 324. The USB System uses the Host Controller 320 to manage data transfers between the host 300 and USB devices 302. The USB System, in concert with the host controller 320, performs the translation between the client software application's view of data transfers and USB transactions appearing on the physical USB interconnect 324. The host controller 320 has access to the schedule or "transaction list" and traverses or processes it to translate it into appropriate bus activity. The host controller 320 ensures that the bus access rules defined by the protocol are obeyed, such as inter-packet timings, timeouts, babble, etc. and may also provide a reporting mechanism whereby the status of a transaction (done, pending, halted, etc.) can be obtained.

Figure 4:
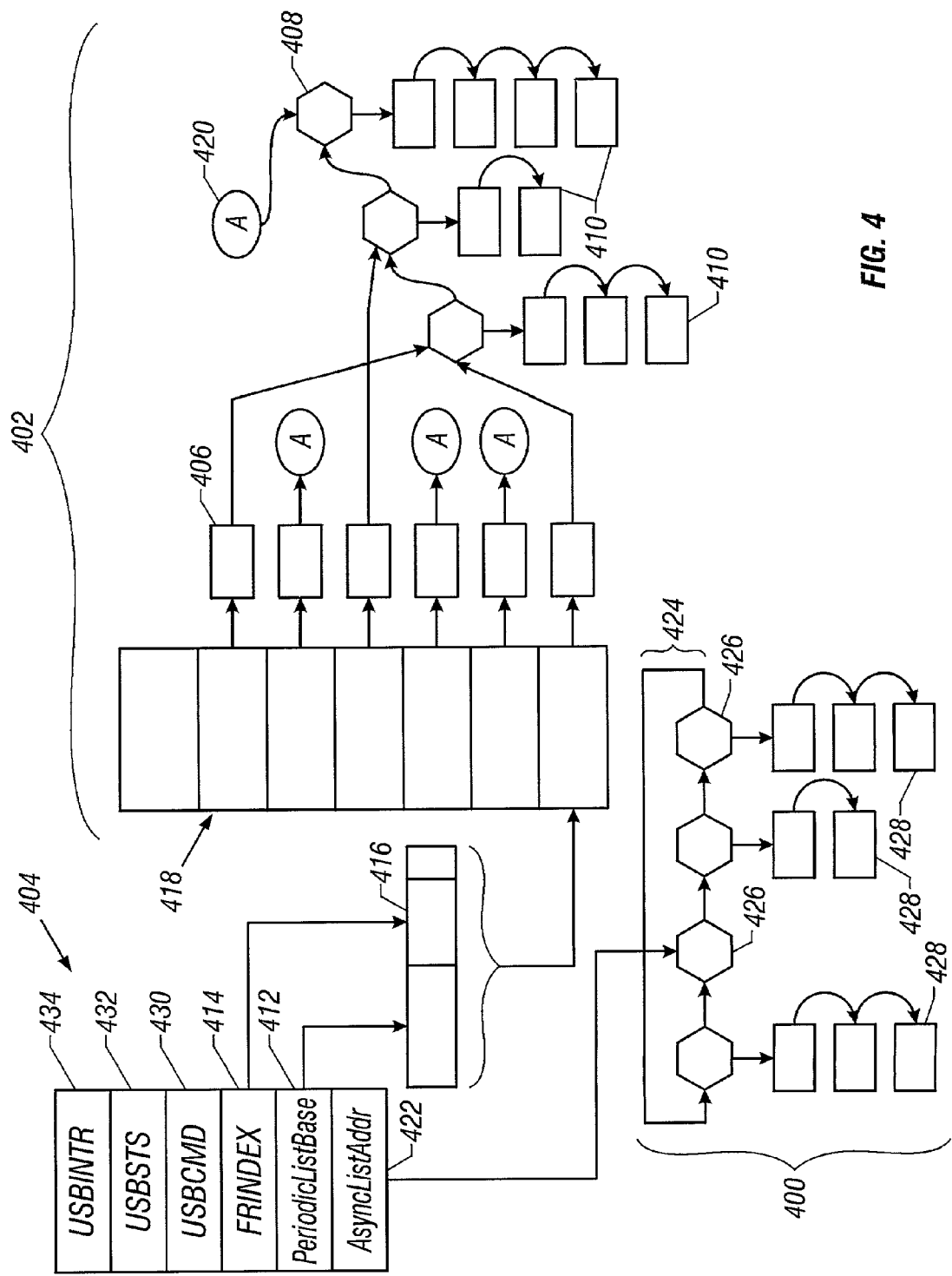
FIG. 4 illustrates an exemplary schedule data structure layout according to an embodiment of the present invention.

FIG. 4 illustrates an exemplary schedule data structure layout according to an embodiment of the present invention. In the illustrated embodiment, an asynchronous schedule 400 and a periodic schedule 402 are provided. Asynchronous schedule 400 provides support for asynchronous (control and bulk) transfers on the USB and accordingly includes one or more control and/or bulk transfer queue heads 426 and corresponding queue element transfer descriptors 428. Periodic schedule 402 provides support for periodic (isochronous and interrupt) transfers on the USB bus and accordingly includes one or more isochronous transfer descriptors 406, interrupt transfer queue heads 408, and interrupt transfer descriptors 410. In one embodiment, both asynchronous schedule 400 and periodic schedule 402 are constructed and maintained by USB system software.

Periodic schedule 402 may be accessed using one or more operational registers 404 and elements of a periodic frame list 418. In the illustrated embodiment, values from a periodic list base address register 412 and a frame index register 414 stored within an operational register space 404 are utilized to reference an element within periodic frame list 418. Periodic list base address register 412, containing the base address of the periodic frame list 418 within memory, and frame index register 414, containing a frame index into periodic frame list 418, together form a periodic frame list element address 416 of a specific periodic frame list element within memory. Periodic frame list 418 is an array of up to 1024 elements which represent a sliding window of periodic schedule work over time. Each entry in periodic frame list 418 corresponds to a particular frame (1 millisecond) or micro-frame (125 microseconds) of time and contains a reference to one or more periodic schedule work items which describe the transactions to be executed during that particular time period. A work item may comprise a transfer descriptor, a queue head, or a combination of the two.

A transfer descriptor expresses the characteristics of a transaction requested on a USB by a client software application. A transfer descriptor typically includes a pointer or reference to a buffer which is to serve as the source or destination for data transfer and may also include status and control data as well as a link pointer or reference to another transfer descriptor or queue head to be executed. A queue head is a data structure which is used to organize non-isochronous (i.e. interrupt, control, or bulk) transfer descriptors. Each queue head contains a "horizontal" link pointer and a "vertical" queue element transfer descriptor pointer. A horizontal link pointer may reference another queue head or alternatively a transfer descriptor such as an isochronous transfer descriptor 406. In one embodiment, a queue element transfer descriptor pointer references a transfer descriptor within a linked list of transfer descriptors corresponding to a current transaction in the list or "queue". Together a transfer descriptor linked list and its associated queue head make up a transfer queue or "queue context".

At the beginning of each (micro)frame, periodic frame list element address 416 is utilized by a host controller to access a periodic schedule work item. The fetched work item is processed or executed and its link pointer, if any, is then utilized to access another work item within the periodic schedule 402. This method is used to traverse the graph of linked periodic schedule data structures from isochronous transfer descriptors 406 to interrupt transfer queues comprised of interrupt transfer queue heads 408 and interrupt transfer descriptors 410 until the current (micro)frame expires or an end of list mark 420 is encountered. If an end of list mark 420 is encountered before the end of the current (micro)frame, the host controller transitions to executing work items from asynchronous schedule 400. If the periodic schedule is enabled, the host controller must attempt to execute from the periodic schedule 402 in each (micro) frame before executing the asynchronous schedule 400. Once the transition is made, the host controller executes from the asynchronous schedule 400 until the end of the (micro)frame. Thereafter, in one embodiment, the value of frame index register 414 is incremented to reference the next element in periodic frame list 418 and the traversal and processing of the periodic 402 and asynchronous 400 schedules are continued.

In the illustrated embodiment, asynchronous schedule 400 is accessed using a value from an asynchronous list address register 422 stored within operational register space 404. Asynchronous address list register 422 contains a reference to a bulk or control queue head 426 within an asynchronous transfer list 424. Asynchronous transfer list 424 is organized as a circular linked list of transfer queues comprised of bulk and/or control queue heads 426 and queue element transfer descriptors 428 coupled together as shown. In this embodiment of the present invention, asynchronous address list register 422 contains a pointer to the next queue head within the asynchronous transfer list 424 to be executed.

When a host controller transitions from periodic 402 to asynchronous 400 schedule execution, it reads the queue head 426 referenced via an asynchronous address list register 422 value and begins executing transactions and traversing the asynchronous linked list 424 as appropriate.

When a host controller encounters a queue head (QH), it caches it internally, and sets internal state to indicate it is in a Q-context. When the host controller "completes" processing asynchronous schedule 400, it retains the value of the last accessed queue head's horizontal link pointer in asynchronous list address register 422. The next time asynchronous schedule 400 is accessed, the value contained in this register references the first data structure or "work item" that will be serviced when the schedule's execution resumes. A host controller "completes" processing the asynchronous schedule when the host controller detects an empty list condition, the schedule has been disabled, or the end of a (micro)frame occurs.

In the illustrated embodiment, operational register space 404 further includes a USB command register 430, a USB status register 432, and a USB interrupt enable register 434 according to the present invention. USB interrupt enable register 434 enables and disables reporting of corresponding interrupts to USB system software. When an interrupt enable bit is set and the corresponding interrupt source is active, an interrupt is generated. In one embodiment, USB interrupt enable register 434 includes an Interrupt on Async Advance Enable bit to indicate whether an Interrupt on Async Advance interrupt is enabled.

USB status register 432 indicates pending interrupts as well as various host controller states. In one embodiment, USB status register 432 includes an Asynchronous Schedule Status bit to report the current real status (i.e. enabled/disabled) of the asynchronous schedule 400 and a Periodic Schedule Status bit to report the current real status of the periodic schedule 402. In another embodiment, USB status register 432 includes an Interrupt on Async Advance bit which indicates the assertion of an Interrupt on Async Advance interrupt source.

USB command register 430 is utilized as a USB host controller interface for USB system software to indicate a command to be executed by USB host controller hardware. Manipulating or modifying the bits of USB command register 430 controls the USB host controller's ability to process the asynchronous 400 and periodic 402 schedules, and may by extension cause commands or transactions to be executed on the USB by USB host controller hardware. The bits of USB command register 430 are primarily control structures however and do not explicitly control command execution. In one embodiment of the present invention, USB command register includes an Asynchronous Schedule Enable bit which indicates whether or not asynchronous schedule 400 is to be processed or "executed" by a host controller and a Periodic Schedule Enable bit which indicates whether or not periodic schedule 402 is to be processed. In another embodiment of the present invention, USB command register 430 further includes an Interrupt on Async Advance Doorbell bit to indicate a removal of a work item from asynchronous schedule 400. The information communicated in this bit is a request for USB host controller hardware to indicate when (relative to USB system software setting the bit) all currently cached structures or references to structures have been purged from host controller hardware.

Figure 5:
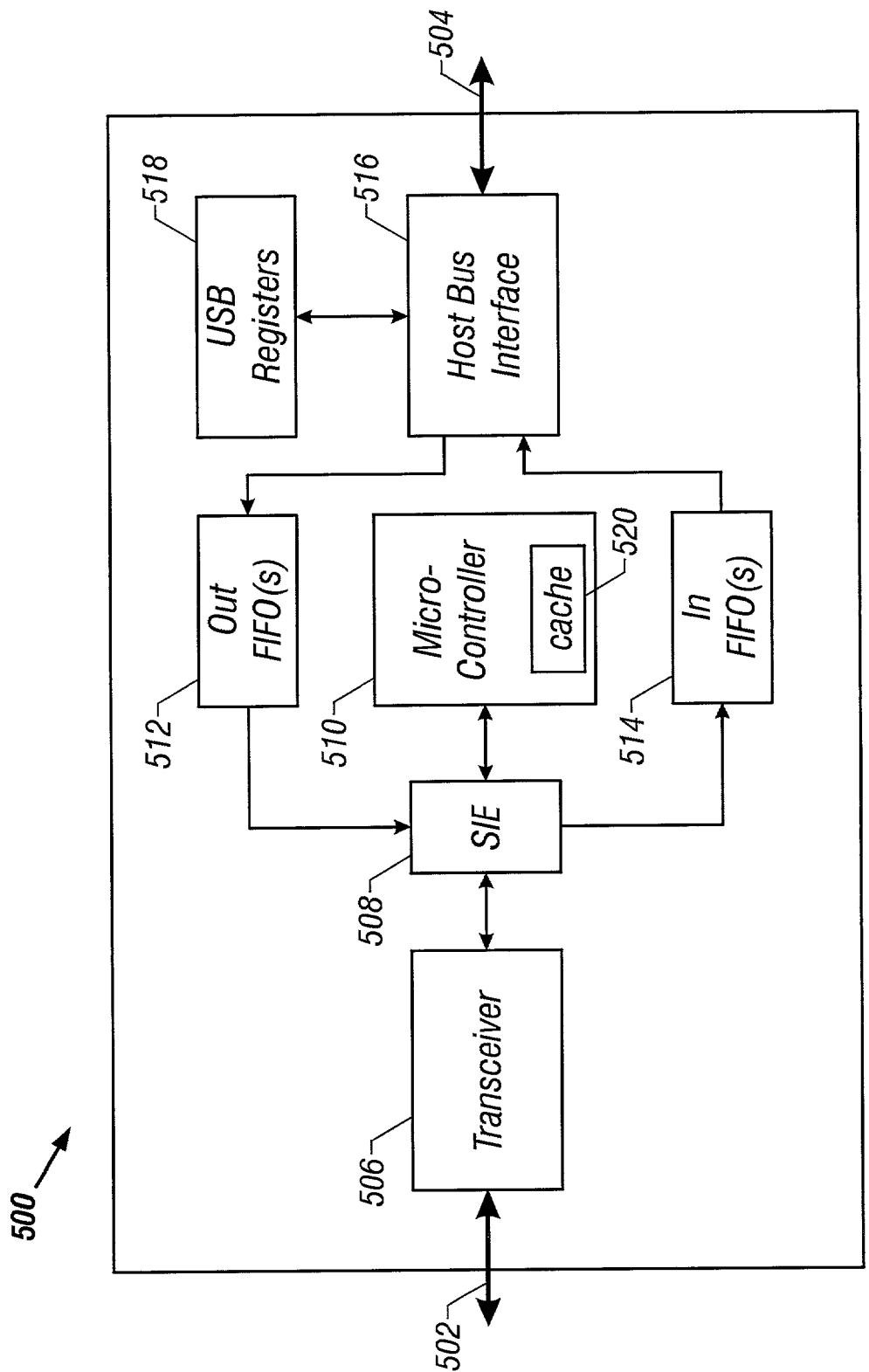
FIG. 5 illustrates a USB host controller block diagram according to an embodiment of the present invention.

FIG. 5 illustrates a USB host controller block diagram according to an embodiment of the present invention. A USB host controller 500 according to one embodiment of the present invention is illustrated coupled to and acting as an interface between a Universal Serial Bus 502 and a host bus 504 such as PCI bus 240 of FIG. 2. To facilitate this interface, USB host controller 500 includes a USB transceiver 506, a serial interface engine (SIE) 508, a microcontroller 510, an input FIFO (first-in, first-out) buffer 514, an output FIFO buffer 512, a host bus interface 516, and one or more USB registers 518.

USB transceiver 506 acts as a serial data transmitter and receiver and provides a parallel data interface to SIE 508. USB transceiver 506 further provides bit stuffing, bit unstuffing, and bit stuff error detection for the USB system. Serial interface engine 508 acts as a serializer/deserializer and an interface between FIFOs 512, 514 and USB transceiver 506. For data transmitted from the host, SIE 508 converts protocol and data information from a host native format to a bit stream transmitted on the USB. For data being received into the host, the reverse operation is performed. In an alternative embodiment, transceiver 506 is primarily a physical interconnect translator, handling analog functionality such as edge rates, current drive, output impedance matching, etc. and SIE 508 is utilized to handle the serial to parallel and parallel to serial translation, bit stuff/unstuffing. The interface between the SIE 508 and transceiver 506 in such an embodiment may be a serial or parallel implementation. Input FIFO 514 provides intermediate storage for data being transmitted from a client software application specified-buffer on a host to a USB device endpoint. Similarly, output FIFO 512 provides intermediate storage for data being transmitted from a device endpoint to a client application buffer. Host bus interface 516 provides a high-speed bus-mastering interface between main system memory of a USB host and the input 514 and output 512 FIFO queues.

In one embodiment, USB host controller 500 includes a register space including configuration registers, capability registers, and operational registers. A configuration register is utilized to properly couple USB host controller 500 to a host bus 504. A capability register is utilized to specify the limits, restrictions, and capabilities of a host controller implementation. An operational register is used by USB system software to control and monitor the operational state of the host controller. In one embodiment, capability registers and operational registers reside within a memory-mapped portion of USB host main memory and USB registers 518 comprise configuration registers. In an alternative embodiment however, USB registers 518 comprise one or more configuration, capability, and/or operational registers.

In the illustrated embodiment, USB host controller 500 further includes a microcontroller 510. Microcontroller 510 utilizes and manages the various other components of USB host controller 500 to process requests for data transmission to and from its attached USB host and serves as a protocol engine to support the protocol specified by the USB. Microcontroller 510 processes or traverses a schedule or "transaction list" in main memory by sequentially retrieving schedule work items and executing them to generate transactions on USB 502. In one embodiment, microcontroller 510 comprises a cache memory 520 to store copies of retrieved work items as it traverses and processes a schedule data structure.

Figure 6:
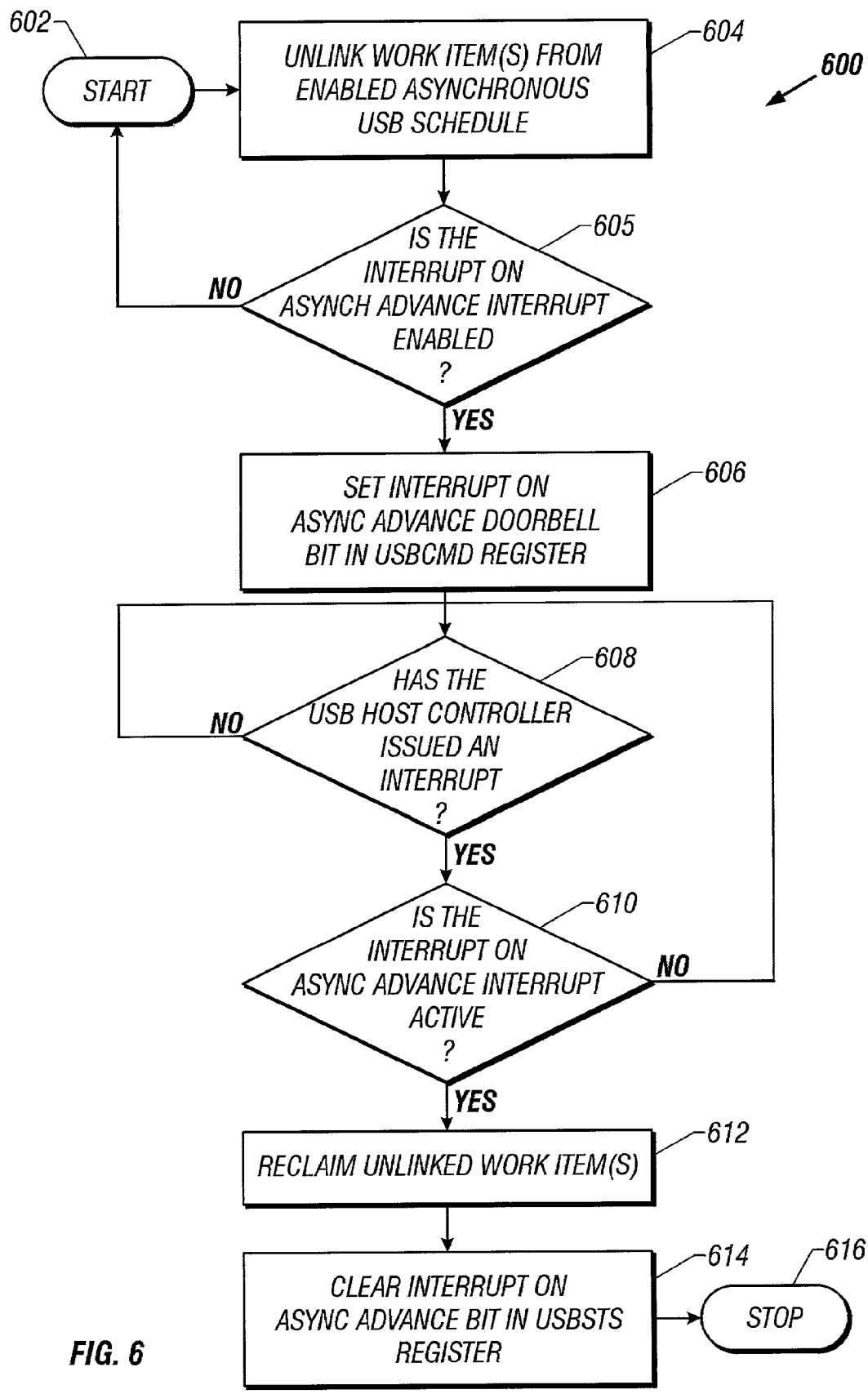
FIG. 6 illustrates a USB system software process flow diagram for one embodiment of the present invention.

FIG. 6 illustrates a USB system software process flow diagram for one embodiment of the present invention. The process 600, illustrated by FIG. 6, begins (block 602) and then one or more work items are unlinked from an enabled asynchronous USB schedule (block 604). In the illustrated embodiment, an Interrupt on Async Advance Enable bit within a USB interrupt enable register is referenced to determine whether or not the Interrupt on Async Advance interrupt is enabled (block 605). Thereafter, if it is determined that the Interrupt on Async Advance interrupt is enabled, a command signal is generated by setting an Interrupt on Async Advance Doorbell bit within a USB command register (block 606). Next, it is determined whether a USB host controller has issued a hardware interrupt (block 608). Once this occurs, USB system software determines whether the Interrupt on Async Advance interrupt is active (block 610). In one embodiment, this may be accomplished by reading a value of the Interrupt on Async Advance bit within the USB status register.

If no interrupt is issued by host controller hardware, or if the Interrupt on Async Advance Interrupt is inactive, the illustrated process remains idle until the Interrupt on Async Advance interrupt is generated. In one embodiment of the present invention, the generation of the Interrupt on Asynch Advance interrupt serves as a coherency signal to notify USB system software that a removed work item may be reclaimed. In another embodiment, a status bit (the Interrupt on Asynch Advance bit within the USB status register) serves as the described coherency signal and USB system software simply polls the Interrupt on Asynch Advance bit to determine when it has been set and consequently when removed work items may be reclaimed. In this embodiment, operations related to the generation of the Interrupt on Asynch Advance interrupt (blocks 605, 608, 610) are not required. Once the coherency signal has been generated however, USB system software reclaims the previously removed work item(s) by freeing or reusing memory or other associated work item resources (block 612). In the illustrated embodiment, USB system software next clears the Interrupt on Async Advance bit within the USB status register to acknowledge the Interrupt on Async Advance interrupt (block 614) after which the process terminates (block 616). It should be appreciated that variations in the order or sequence of the illustrated process 600 may be made without departing from the spirit and scope of the present invention. For example, the Interrupt on Asynch Advance may be cleared (block 614) before unlinked work items are reclaimed (block 612) and the Interrupt on Async Advance Enable bit may be referenced (block 605) prior to allowing work items to be removed or unlinked from the Asynchronous schedule (block 604).

Figure 7:
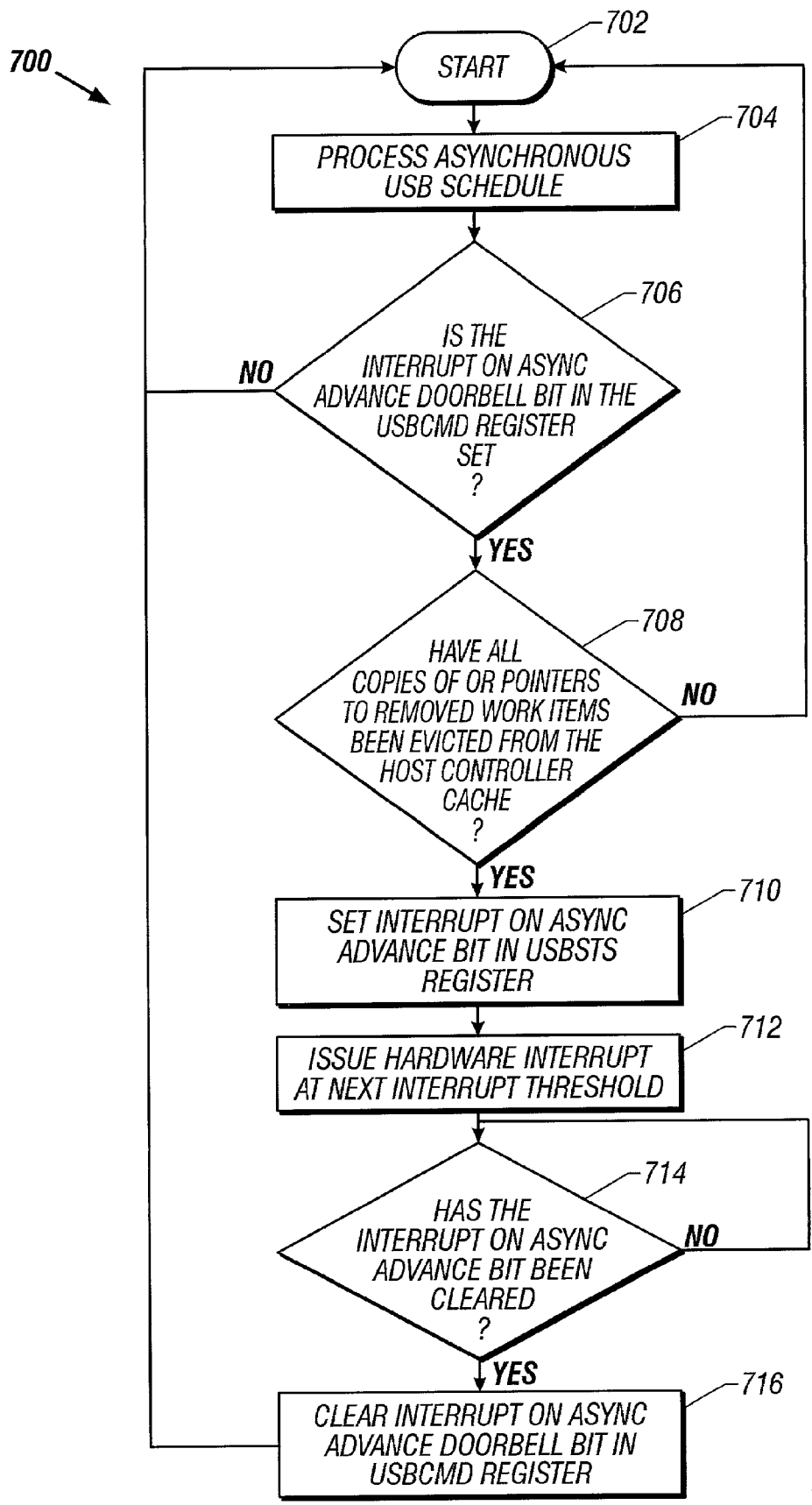
FIG. 7 illustrates a USB host controller process flow diagram for one embodiment of the present invention.

FIG. 7 illustrates a USB host controller flow diagram for one embodiment of the present invention. The illustrated process 700 begins, (block 702) and thereafter the USB host controller processes an enabled asynchronous USB schedule (block 704). Although a single process block has been included, it should be appreciated that a USB host controller processes the asynchronous schedule continuously for the duration of the illustrated process 700. Next, the USB host controller determines whether or not an Interrupt on Async Advance Doorbell bit within a USB command register has been set (block 706) which serves as a command signal for USB system software to indicate that the asynchronous schedule has been modified. If so, the process continues and it is determined whether all local copies of, or pointers to removed work items have been evicted or "released" from USB host controller internal state (block 708).

If the Interrupt on Async Advance Doorbell bit has not been set, or if it is determined that a local copy of, or pointer to a removed work item remains in USB host controller cache, the illustrated process 700 restarts. Otherwise, the USB host controller generates a status signal by setting an Interrupt on Async Advance bit within the USB status register (block 710). If the Interrupt on Async Advance Enable bit in the USB interrupt enable register indicates that the Interrupt on Async Advance interrupt is enabled, the USB host controller will then assert an interrupt at the next opportunity or "interrupt threshold" (block 712). In alternative embodiments of the invention, either the status signal or the interrupt itself may serve as a coherency signal to notify USB system software that a removed work item may be reclaimed. Thereafter, the USB host controller waits until USB system software acknowledges the coherency signal by clearing the Interrupt on Async Advance bit (block 714) and then clears the Interrupt on Async Advance Doorbell bit within the USB command register (block 716) before restarting (block 702).

Figure 8A:
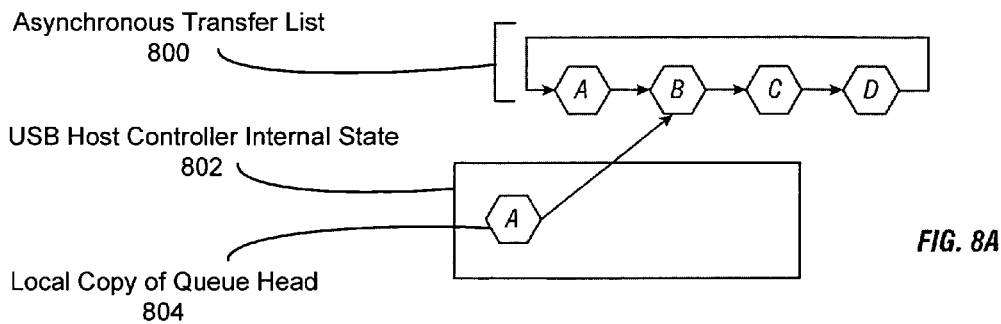
FIGS. 8a–8c illustrate an asynchronous schedule work item removal/reclamation sequence according to an embodiment of the present invention.
Figure 8B:
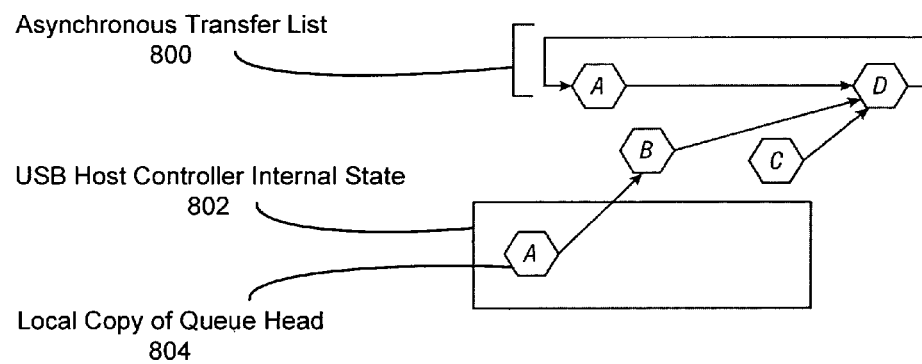
Figure 8C:
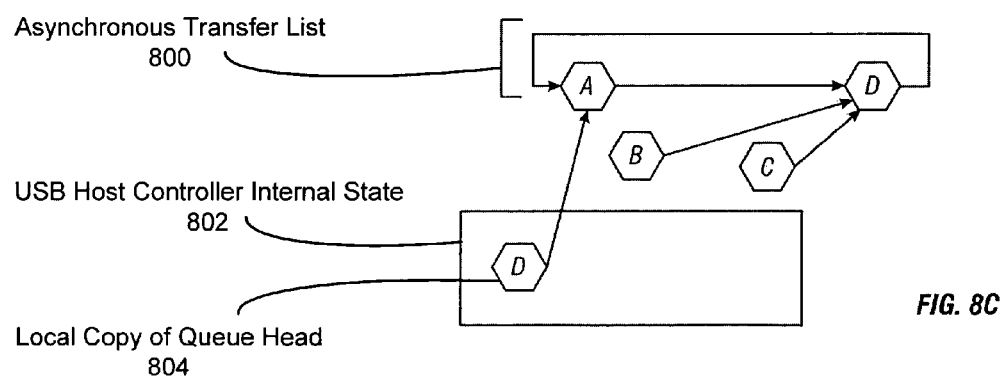

FIGS. 8*a*–8*c* illustrate an asynchronous schedule work item removal and reclamation sequence according to an embodiment of the present invention. In the illustrated embodiment, various states of an asynchronous transfer list 800 and USB host controller internal state 802 during a removal/reclamation sequence are illustrated. In one embodiment, internal state 802 comprises a local copy of a queue head 804 stored within a USB host controller cache memory. It will be appreciated that the depicted sequence is illustrated by way of example and not limitation and that embodiments of the present invention may be practiced utilizing any suitable Universal Serial Bus schedule containing any suitable number or type of data structures or work items.

In FIG. 8*a*, queue heads "B" and "C" are targeted for removal from asynchronous transfer list 800. Initially, asynchronous transfer list 800 includes targeted queue heads ("B" and "C") and the USB host controller internal state 802 includes a local copy of queue head "A" as shown. In FIG. 8*b*, queue heads "B" and "C" are removed or "unlinked" from asynchronous transfer list 800 by USB system software. Although it may be shut down prior to removing one or more queue heads, asynchronous transfer list 800 is typically left enabled or "activated" during the removal process. Accordingly, one or more USB host controllers may independently process or "traverse" the schedule as work items are being removed. As each queue head is removed, its horizontal link pointer is modified to reference a queue head which will remain in the schedule following the unlink operation(s) (e.g. queue head "D" in the illustrated example).

At this point, USB system software is unaware whether USB host controller internal state 802 contains a removed schedule work item or a reference to a removed schedule work item (e.g. the cached link pointer of queue head "A" which references removed queue head "B"). Similarly, it is unknown how long a USB host controller might retain cached data relating to a removed schedule work item, as it is implementation-dependent and may be affected by the actual dynamics of the schedule load. Therefore, USB system software retains the coherency of each removed queue head (link pointers, etc.) until it determines or is notified that a USB host controller does not contain a local copy of, or a pointer to, any of the removed data structures and consequently that it is safe to reclaim a removed work item without risk of the USB hardware controller executing invalid data structures.

To determine that it is safe to reclaim a removed work item, USB system software performs a handshake with the USB host controller. Following the removal of one or more queue heads from the asynchronous schedule, an Interrupt on Async Advance Doorbell bit within a USB command register is set by USB system software to indicate that the asynchronous schedule has been altered. In one embodiment, the Interrupt on Async Advance Doorbell bit is used by USB system software to request that the host controller set the Interrupt on Async Advance bit in the USB status register and issue an interrupt the next time the asynchronous schedule is advanced (FIG. 8c) following assertion of the Interrupt on Async Advance Doorbell.

In another embodiment, once the Interrupt on Async Advance Doorbell bit has been set, the USB host controller identifies which of the asynchronous schedule work items are accessible using the current internal state 802. In FIG. 8b of the illustrated example, accessible work items include both queue head "A" (a copy of which is stored in the USB host controller internal state 802) and queue head "B" (which is reachable via the cached link pointer of queue head "A"). The USB host controller then continues to process the asynchronous schedule and once it has traversed beyond current accessible schedule work items (i.e. traversed beyond queue head "B" as in FIG. 8c of the illustrated example) it sets the Interrupt on Async Advance bit in the USB status register.

In still other alternative embodiments, the USB host controller may set the Interrupt on Async Advance bit in the USB status register in response to a detection of a cache flush operation of a USB host controller cache memory or the removal from USB host controller cache of specific work items identified using tags or other similar identifiers.

In the foregoing description, the present invention has been described with reference to specific exemplary embodiments thereof. It will be apparent however, that variations or modification of the exemplary embodiments described as well as alternative embodiments of the present invention may be implemented without departing from the broader spirit or scope of the present invention as defined in the appended claims. For example, it should be apparent that the method of the present invention could be implemented with other expansion bus technologies having separate schedules for isochronous and asynchronous transfers. The specification and drawings are accordingly to be regarded in an illustrative rather than a restrictive sense.

What is claimed is:

1. A method comprising:
   removing a work item of a plurality of work items from an enabled expansion bus schedule data structure;
   generating a coherency signal independent of said work item utilizing an expansion bus host controller in response to removing said work item from said enabled expansion bus schedule data structure; and
   reclaiming said work item by updating a memory, freeing a memory, or reusing a memory after said coherency signal is generated.

2. The method as set forth in claim 1, wherein said enabled expansion bus schedule data structure comprises an asynchronous schedule including a plurality of queue heads and removing said work item from said enabled expansion bus schedule data structure comprises unlinking a first queue head of said plurality of queue heads from said asynchronous schedule.

3. The method as set forth in claim 2, wherein said plurality of queue heads includes a second queue head, said second queue head includes a horizontal link pointer to said first queue head, and unlinking said first queue head from said asynchronous schedule comprises modifying said horizontal link pointer of said second queue head.

4. The method as set forth in claim 2, said method further comprising:
   generating a command signal in response to removing said work item from said enabled expansion bus schedule data structure; wherein,
   generating a coherency signal utilizing an expansion bus host controller in response to removing said work item from said enabled expansion bus schedule data structure comprises generating a status signal utilizing said expansion bus host controller in response to generating said command signal.

5. The method as set forth in claim 1, wherein generating a coherency signal utilizing an expansion bus host controller in response to removing said work item from said enabled expansion bus schedule data structure comprises:
   traversing said plurality of work items according to a sequence;
   storing a copy of a work item within a memory in response to traversing said plurality of work items; and
   generating a coherency signal utilizing said copy of said work item.

6. The method as set forth in claim 5, wherein generating a coherency signal utilizing said copy of said work item comprises:
   detecting a removal of said copy of said work item from said memory in response to removing said work item from said enabled expansion bus schedule data structure; and
   generating a coherency signal in response to detecting said removal of said copy of said work item from said memory.

7. The method as set forth in claim 6, wherein detecting a removal of said copy of said work item from said memory in response to removing said work item from said enabled expansion bus schedule data structure comprises detecting a cache flush operation.

8. The method as set forth in claim 5, wherein generating a coherency signal utilizing said copy of said work item comprises:
   identifying an accessible work item of said plurality of work items utilizing said copy of said work item; and
   generating a coherency signal in response to traversing beyond said accessible work item in said sequence.

9. The method as set forth in claim 5, said method further comprising:
   executing a transaction on a Universal Serial Bus in response to traversing said plurality of work items.

10. The method as set forth in claim 1, said method further comprising storing each of said plurality of work items within a memory, wherein reclaiming said work item in response to generating said coherency signal comprises freeing a portion of said memory associated with said work item.

11. A computer program product in a recordable-type media that provides instructions which when executed by a machine cause said machine to perform operations comprising:
   removing a work item of a plurality of work items from an enabled expansion bus schedule data structure;
   generating a coherency signal independent of said work item utilizing an expansion bus host controller in response to removing said work item from said enabled expansion bus schedule data structure; and
   reclaiming said work item by updating a memory, freeing a memory, or reusing a memory after said coherency signal is generated.

12. The computer program product as set forth in claim 11, wherein said enabled expansion bus schedule data structure comprises an asynchronous schedule including a plurality of queue heads and removing said work item from said enabled expansion bus schedule data structure comprises unlinking a first queue head of said plurality of queue heads from said asynchronous schedule.

13. The computer program product as set forth in claim 12, wherein said plurality of queue heads includes a second queue head, said second queue head includes a horizontal link pointer to said first queue head, and unlinking said first queue head from said asynchronous schedule comprises modifying said horizontal link pointer of said second queue head.

14. The computer program product as set forth in claim 12, said operations further comprising:
generating a command signal in response to removing said work item from said enabled expansion bus schedule data structure; wherein,
generating a coherency signal utilizing an expansion bus host controller in response to removing said work item from said enabled expansion bus schedule data structure comprises generating a status signal utilizing said expansion bus host controller in response to generating said command signal.

15. The computer program product as set forth in claim 11, wherein generating a coherency signal utilizing an expansion bus host controller in response to removing said work item from said enabled expansion bus schedule data structure comprises:
traversing said plurality of work items according to a sequence;
storing a copy of a work item within a memory in response to traversing said plurality of work items; and
generating a coherency signal utilizing said copy of said work item.

16. The computer program product as set forth in claim 15, wherein generating a coherency signal utilizing said copy of said work item comprises:
detecting a removal of said copy of said work item from said memory in response to removing said work item from said enabled expansion bus schedule data structure; and
generating a coherency signal in response to detecting said removal of said copy of said work item from said memory.

17. The computer program product as set forth in claim 16, wherein detecting a removal of said copy of said work item from said memory in response to removing said work item from said enabled expansion bus schedule data structure comprises detecting a cache flush operation.

18. The computer program product as set forth in claim 15, wherein generating a coherency signal utilizing said copy of said work item comprises:
identifying an accessible work item of said plurality of work items utilizing said copy of said work item; and
generating a coherency signal in response to traversing beyond said accessible work item in said sequence.

19. The computer program product as set forth in claim 15, said operations further comprising:
executing a transaction on a Universal Serial Bus in response to traversing said plurality of work items.

20. The computer program product as set forth in claim 11, said operations further comprising storing each of said plurality of work items within a memory, wherein reclaiming said work item in response to generating said coherency signal comprises freeing a portion of said memory associated with said work item.

21. An apparatus comprising:
a command register including a command signal bit to indicate a removal of a work item from an expansion bus schedule data structure including a plurality of work items, wherein the command signal bit is independent of the work item;
a status register including a status signal bit to notify an expansion bus host controller driver that resources assigned to said work item may be reclaimed by updating a memory, freeing a memory, or reusing a memory; and
a microcontroller to process said expansion bus schedule data structure and to modify said status signal bit of said status register in response to said removal of said work item from said expansion bus schedule data structure.

22. The apparatus as set forth in claim 21, wherein said expansion bus schedule data structure comprises a Universal Serial Bus (USB) asynchronous schedule.

23. The apparatus as set forth in claim 21, further comprising a cache memory to store a copy of a work item; wherein said microcontroller to process said expansion bus schedule data structure and to modify said status signal bit of said status register comprises:
a microcontroller to traverse said plurality of work items according to a sequence, to store said copy of said work item within said cache memory, and to modify said status signal bit of said status register utilizing said copy of said work item.

24. The apparatus as set forth in claim 23, wherein said microcontroller to modify said status signal bit of said status register utilizing said copy of said work item comprises:
a microcontroller to modify said status signal bit of said status register in response to a removal of said copy of said work item from said cache memory.

25. The apparatus as set forth in claim 24, wherein said microcontroller to modify said status signal bit of said status register in response to a removal of said copy of said work item from said cache memory comprises a microcontroller to modify said status signal bit of said status register in response to a cache flush operation.

26. The apparatus as set forth in claim 23, wherein said microcontroller to modify said status signal bit of said status register utilizing said copy of said work item comprises:
a microcontroller to identify an accessible work item of said plurality of work items utilizing said copy of said work item and to modify said status signal bit of said status register in response to a traversal beyond said accessible work item in said sequence.

27. A computer system comprising:
a memory to store an expansion bus schedule data structure including a plurality of work items;
an expansion bus host controller comprising:
a command register including a command signal bit independent of the plurality of work items;
a status register including a status signal bit; and
a microcontroller to process said expansion bus schedule data structure and to modify said status signal bit of said status register in response to a modification of said command signal bit; and
a processor to remove a work item of said plurality of work items from said expansion bus schedule data structure, to modify said command signal bit in response to said removal of said work item from said expansion bus schedule data structure; and to reclaim said work item by updating the memory, freeing the memory, or reusing the memory in response to a modification of said status signal bit.

28. The computer system as set forth in claim 27, wherein said expansion bus host controller further comprises a cache memory to store a copy of a work item and said microcontroller to process said expansion bus schedule data structure and to modify said status signal bit of said status register comprises:

a microcontroller to traverse said plurality of work items according to a sequence, to store said copy of said work item within said cache memory, and to modify said status signal bit of said status register utilizing said copy of said work item.

29. The computer system as set forth in claim 28, wherein said microcontroller to modify said status signal bit of said status register utilizing said copy of said work item comprises:
   a microcontroller to modify said status signal bit of said status register in response to a removal of said copy of said work item from said cache memory.

30. The computer system as set forth in claim 28, wherein said microcontroller to modify said status signal bit of said status register utilizing said copy of said work item comprises:
   a microcontroller to identify an accessible work item of said plurality of work items utilizing said copy of said work item and to modify said status signal bit of said status register in response to a traversal beyond said accessible work item in said sequence.

* * * * *